(12) United States Patent
Bejar et al.

(10) Patent No.: US 11,082,514 B2
(45) Date of Patent: Aug. 3, 2021

(54) PUSH NOTIFICATION MANAGEMENT

(71) Applicant: INTERNATIONAL BUSINESS MACHINES CORPORATION, Armonk, NY (US)

(72) Inventors: Alvaro Antonio Bejar, London (GB); Joseph Alexander Cass, Stockton-on-Tees (GB); Samuel Stephen Walker, Greetland (GB); Alexander John Naylor, Newbury (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/421,926

(22) Filed: May 24, 2019

(65) Prior Publication Data
US 2020/0374356 A1   Nov. 26, 2020

(51) Int. Cl.
*H04L 29/08* (2006.01)
*G06F 9/54* (2006.01)
*G06N 20/00* (2019.01)
*G06F 16/215* (2019.01)
*G06F 40/40* (2020.01)

(52) U.S. Cl.
CPC .............. *H04L 67/26* (2013.01); *G06F 9/542* (2013.01); *G06F 16/215* (2019.01); *G06F 40/40* (2020.01); *G06N 20/00* (2019.01)

(58) Field of Classification Search
CPC ......... H04L 67/26; G06F 40/40; G06F 9/542; G06F 16/215; G06F 40/30; G06N 20/00
See application file for complete search history.

(56) References Cited

U.S. PATENT DOCUMENTS

| 8,312,096 B2 | 11/2012 | Cohen |
| 9,071,603 B1 | 6/2015 | Frederick |
| 9,325,655 B1 * | 4/2016 | Bilinski .................. H04L 51/24 |
| 9,426,162 B2 | 8/2016 | Dabbiere |

(Continued)

FOREIGN PATENT DOCUMENTS

CN   105843615 A   8/2016

OTHER PUBLICATIONS

Mell et al., "The NIST Definition of Cloud Computing", National Institute of Standards and Technology, Special Publication 800-145, Sep. 2011, pp. 1-7.

(Continued)

*Primary Examiner* — Caroline H Jahnige
(74) *Attorney, Agent, or Firm* — Alexis N. Hatzis

(57) ABSTRACT

A method, computer system, and computer program product for reducing the display of duplicate push notifications in a device having a plurality of applications is provided. A first one of the plurality of applications is identified as a preferred one of the plurality of applications from which push notifications are to be displayed on the device. The focus of each of the duplicate push notifications is determined. A determination is made as to whether the focus of a first push notification received from the first one of the plurality of applications is the same as the focus of a second push notification received from a second one of the plurality of applications. Responsive to the focus of the first push notification being the same as the focus of the second push notifications, only the first push notification is displayed on the device.

17 Claims, 10 Drawing Sheets

(56) References Cited

U.S. PATENT DOCUMENTS

| | | | |
|---|---|---|---|
| 10,027,614 B1* | 7/2018 | Agrawal | H04M 1/72519 |
| 10,069,783 B2 | 9/2018 | Sharifi | |
| 2003/0020623 A1 | 1/2003 | Cao | |
| 2005/0144293 A1 | 6/2005 | Limont | |
| 2008/0032703 A1 | 2/2008 | Krumm | |
| 2012/0084792 A1 | 4/2012 | Benedek | |
| 2012/0203862 A1 | 8/2012 | Tayeb | |
| 2015/0188871 A1* | 7/2015 | Lewis | H04L 51/24 |
| | | | 709/207 |
| 2017/0104835 A1* | 4/2017 | Goel | H04L 51/00 |
| 2017/0140052 A1* | 5/2017 | Bufe, III | H04L 67/22 |
| 2018/0167349 A1 | 6/2018 | James | |
| 2018/0167688 A1 | 6/2018 | Lewis | |
| 2019/0268297 A1* | 8/2019 | Vendrow | H04L 67/26 |
| 2019/0310997 A1* | 10/2019 | Gratton | G06F 16/24552 |

OTHER PUBLICATIONS stackoverflow.com, "How to sync push notifications across multiple iOS devices", Retrieved on May 24, 2019, 2 Pages, Retrieved from Internet: <URL: https://stackoverflow.com/questions/34549453/how-to-sync-push-notifications-across-multiple-ios-devices>.

The Windows Club, "How to sync notifications &reminders across devices using Cortana", Retrieved online: May 24, 2019, 5 Pages, Retrieved from the Internet: <URL: https://www.thewindowsclub.com/sync-notifications-across-devices-cortana>.

* cited by examiner

PUSH NOTIFICATION MANAGEMENT

BACKGROUND

The present invention relates generally to the field of computing, and more particularly to notification management (e.g., managing a plurality of notifications having the same or similar content based on user preferences).

Users may receive information from a number of different sources on a number of different devices. Sometimes a user may be given a push notification about the same or similar information from a number of different sources. A notification may be received by a user who may have multiple applications that send similar notifications, such as different providers of sporting results. The user may then be notified multiple times about the same sports event or news event from each of the different sources. The notifications may result in a duplicity of information being shown to the user in the form of push notifications.

SUMMARY

Embodiments of the present invention disclose a method, computer system, and a computer program product for reducing the display of duplicate push notifications in a device having a plurality of applications, the duplicate push notifications being generated by the plurality of applications. The present invention may include identifying a first one of the plurality of applications as a preferred one of the plurality of applications from which push notifications are to be displayed on the device; determining the focus of each of the duplicate push notifications; determining whether the focus of a first push notification received from the first one of the plurality of applications is the same as the focus of a second push notification received from a second one of the plurality of applications; and responsive to the focus of the first push notification being the same as the focus of the second push notifications, displaying on the device only the first push notification.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
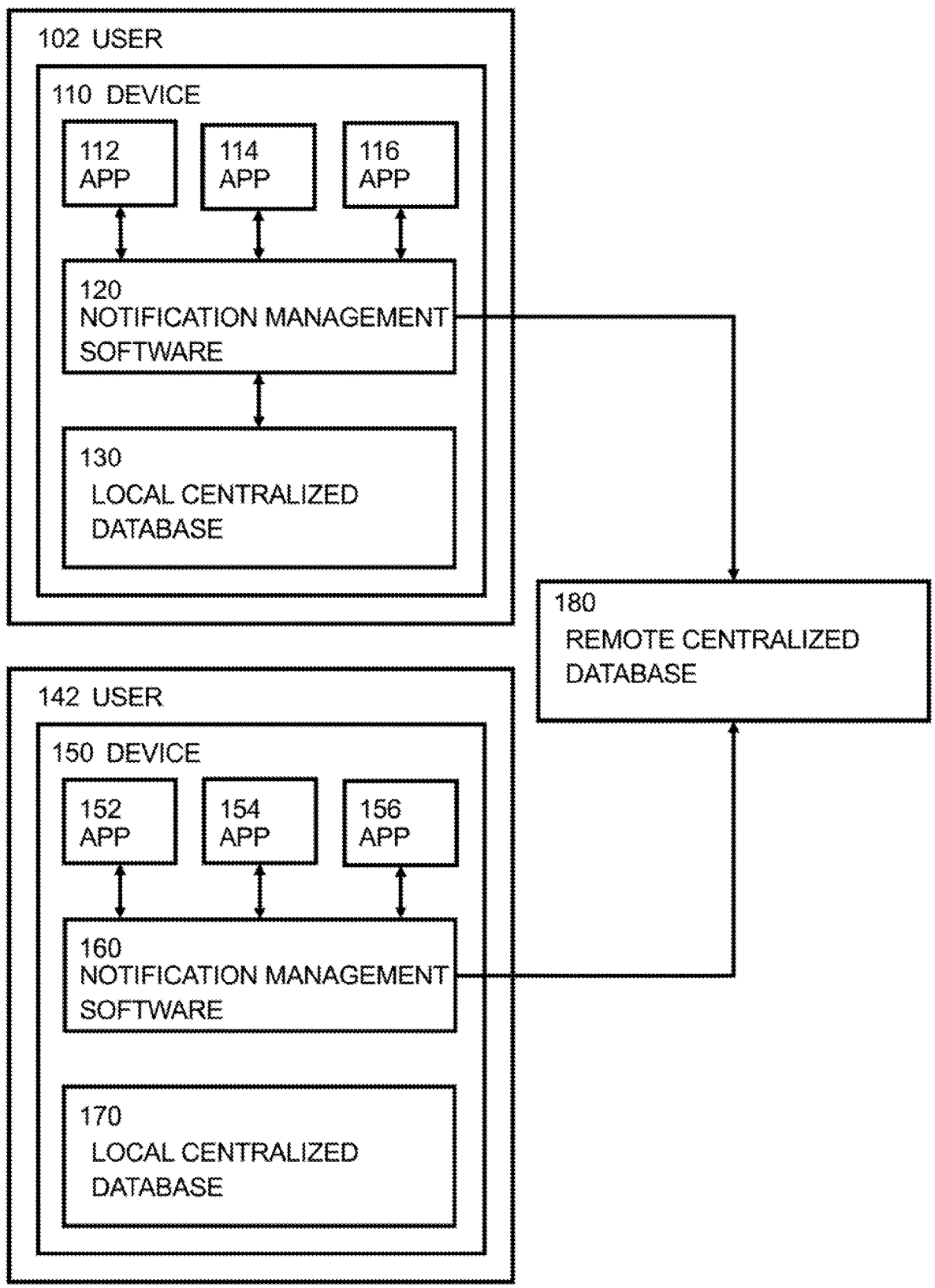
FIG. 1 is a block diagram of the computer system in which embodiments of the present invention may be implemented.

Referring to FIG. 1, a block diagram of the computer system in which embodiments of the present invention may be implemented is depicted. A user 102 and/or 142 may use a device 110 and/or 150. Device 110 and/or 150 may have a plurality of apps (i.e., applications), including APP 112, APP 114, APP 116, APP 152, APP 154 and/or APP 156 installed on the device 110 and/or 150. Although three apps are depicted on each of devices 110 and 150 (e.g., APP 112, APP 114, APP 116, APP 152, APP 154 and/or APP 156), any number of apps may be used in embodiments of the present invention. Notification management software 120 and/or 160 may be installed on each of devices 110 and/or 150 to manage notifications provided by the installed apps (e.g., APP 112, APP 114, APP 116, APP 152, APP 154 and/or APP 156) before the notifications may be provided to user 102 and/or 142. Local centralized databases 130 and/or 170 associated with respective notification management software 120 and 160 may contain information about previous notifications received by user 102 and/or 142, respectively. Remote centralized database 180 may contain information about previous notifications received from any of the instances of the notification management software 120 and/or 160, among other instances. Embodiments of the present invention may comprise local centralized databases 130 and/or 170 associated with each of respective notification management software instances 120 and/or 160 or may comprise a single remote centralized database 180 which may receive information about previous notifications from more than one instance of notification management software 120 and/or 160.

Embodiments of the present invention may reduce the display of duplicate push notifications in a device having a plurality of applications. The duplicate push notifications may be generated by one of the plurality of applications. Embodiments of the present invention may reduce the number of notifications a user 102 and/or 142 receives or may prevent such notifications from being received altogether. According to at least one embodiment of the present invention, user 102 and/or 142 may be able to set notification preferences, such as, for example, whether or not user 102 and/or 142 wishes to receive certain notifications during a set period of time, based on a variety of factors. According to at least one other embodiment of the present invention, notifications may be toggled on and off automatically based on the prior usage and/or personal preferences of user 102 and/or 142. This may be achieved through machine learning.

Figure 2A:
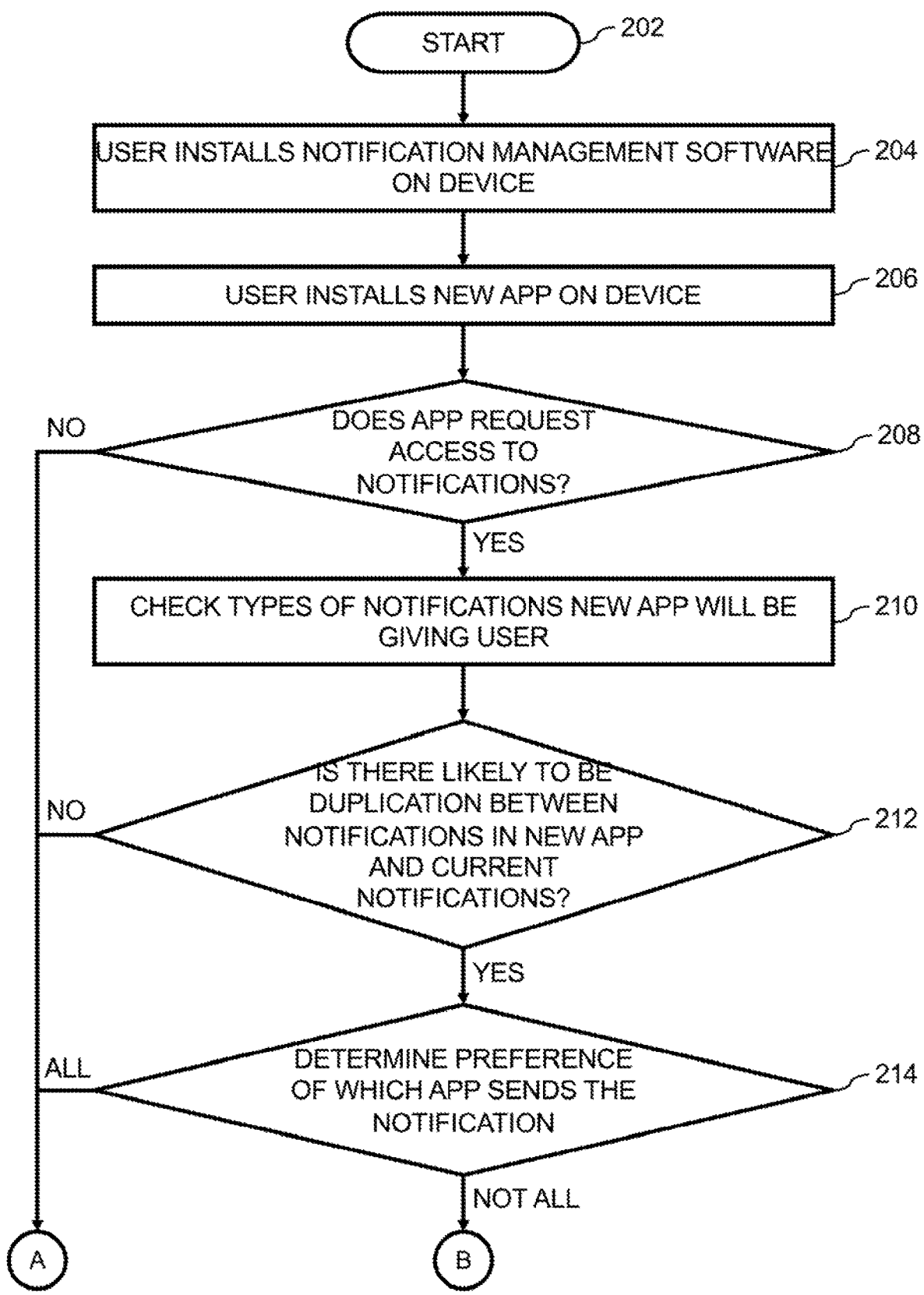
FIGS. 2A and 2B are an operational flowchart illustrating a computer-implemented method for initializing push notification management according to at least one embodiment.
Figure 2B:
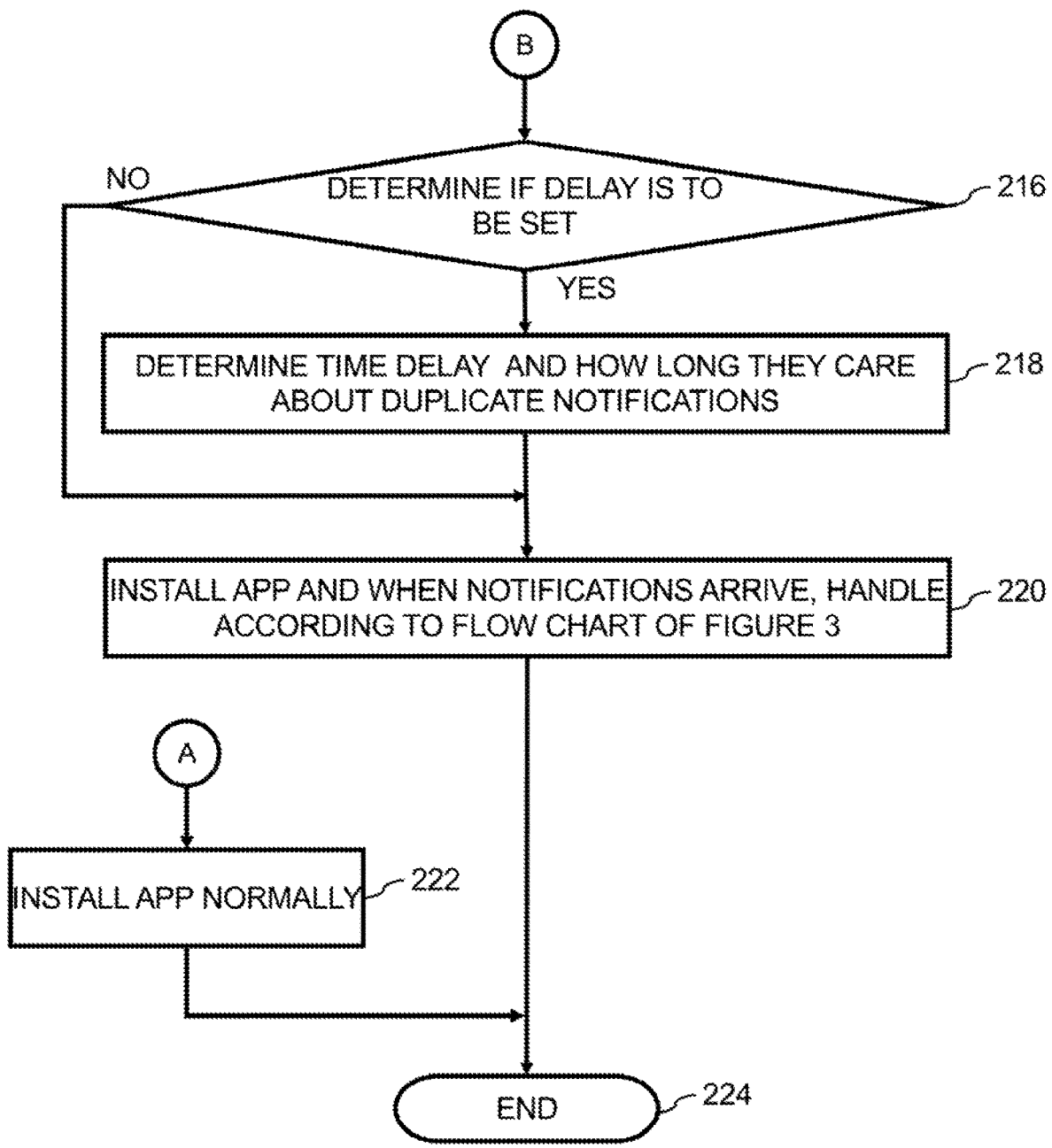

Referring now to FIGS. 2A and 2B, an operational flowchart illustrating a computer-implemented method for initializing push notification management according to at least one embodiment is depicted. The computer-implemented method of FIGS. 2A and 2B may begin at step 202. At step 204, a user 102 and/or 142 installs notification management software 120 and/or 160 on device 110 and/or 150. Step 204 may be completed once and the notification management software 120 and/or 160 may remain installed on device 110 and/or 150. The notification management software 120 and/or 160 may be re-installed on device 110 and/or 150 in the event of a problem with the notification management software 120 and/or 160 or in the event of the release of an updated version of the notification management software 120 and/or 160.

At step 206, user 102 and/or 142 installs a new app (e.g., APP 112, APP 114, APP 116, APP 152, APP 154 and/or APP 156) on device 110 and/or 150. This step may be executed each time a user 102 and/or 142 installs a new app (e.g., APP 112, APP 114, APP 116, APP 152, APP 154 and/or APP 156) on device 110 and/or 150.

At step 208, it is determined whether the app requests access to notifications. An app (e.g., APP 112, APP 114, APP 116, APP 152, APP 154 and/or APP 156) may request access to notifications if the app attempts to provide notifications to user 102 and/or 142. If it is determined that the app (e.g., APP 112, APP 114, APP 116, APP 152, APP 154 and/or APP 156) does not request access to notifications, then processing proceeds through connector "A" to step 222 in FIG. 2B. At step 222, the app (e.g., APP 112, APP 114, APP 116, APP 152, APP 154 and/or APP 156) is installed normally and processing ends at step 224. If it is determined that the app (e.g., APP 112, APP 114, APP 116, APP 152, APP 154 and/or APP 156) does request access to notifications, then processing proceeds to step 210. At step 210, a check is made as to what types of notifications the app (e.g., APP 112, APP 114, APP 116, APP 152, APP 154 and/or APP 156) intends to provide to user 102 and/or 142.

At step 212, it is determined whether there is likely to be duplication between notifications generated by a newly installed app and notifications generated by an existing app (e.g., APP 112, APP 114, APP 116, APP 152, APP 154 and/or APP 156). According to at least one embodiment of the present invention, the determination may be based upon a category in which the app is listed in a store from which the app is obtained. For example, for Android™ apps on the Google Play™ store and for iOS™ apps on the Apple® App Store®, apps (e.g., APP 112, APP 114, APP 116, APP 152, APP 154 and/or APP 156) are listed by category, including but not limited to, "music and audio," "entertainment," "social," and "business." According to at least one other embodiment of the present invention, once the notification management software 120 and/or 160 has been running (i.e., executing) on a number of devices 110 and/or 150 belonging to a number of users 102 and/or 142, the notification management software 120 and/or 160 may begin to learn a type (e.g., using a machine learning algorithm) of content that each app (e.g., APP 112, APP 114, APP 116, APP 152, APP 154 and/or APP 156) is likely to send notifications about. This information may be provided to a localized centralized database 130 and/or 170 and/or a remote centralized database 180 which may provide this information to device 110 and/or 150 about an app downloaded by user 102 and/or 142. Further, a localized centralized database 130 and/or 170 and/or a remote centralized database 180 may be used to determine whether an app (e.g., APP 112, APP 114, APP 116, APP 152, APP 154 and/or APP 156) sends different genres of notification(s) from different groups of authors. If it is determined that there is not likely to be duplication between notification(s) to be provided by the app (e.g., APP 112, APP 114, APP 116, APP 152, APP 154 and/or APP 156) being installed (i.e., a newly installed app) and app (e.g., APP 112, APP 114, APP 116, APP 152, APP 154 and/or APP 156) already installed (i.e., an existing app), then processing proceeds through connector "A" to step 222 in FIG. 2B. At step 222, the app (e.g., APP 112, APP 114, APP 116, APP 152, APP 154 and/or APP 156) is installed normally and processing ends at step 224.

If it is determined at step 212 that there is likely to be duplication between notifications to be provided by the app (e.g., APP 112, APP 114, APP 116, APP 152, APP 154 and/or APP 156) being installed (i.e., a newly installed app) and apps (e.g., APP 112, APP 114, APP 116, APP 152, APP 154 and/or APP 156) already installed (i.e., an existing app), then processing proceeds to step 214.

At step 214, the preference as to which app (e.g., APP 112, APP 114, APP 116, APP 152, APP 154 and/or APP 156) sends notifications for different types of content is determined. This may be done by identifying a first one of the plurality of apps (e.g., APP 112, APP 114, APP 116, APP 152, APP 154 and/or APP 156) as a preferred one of the plurality of apps (e.g., APP 112, APP 114, APP 116, APP 152, APP 154 and/or APP 156) from which push notifications are to be displayed on device 110 and/or 150.

According to at least one embodiment of the present invention, a request may be made of user 102 and/or 142 for the user's preference. For example, a user (e.g., user 102 and/or 142) may have more than one news app (e.g., APP 112, APP 114, APP 116, APP 152, APP 154 and/or APP 156). This may be for any number of reasons, including but not limited to the fact that different news sources may report on different types of news in different styles or in levels of detail. The user may prefer to read about political affairs in the AP Mobile app, celebrity gossip news from the Google News app and economic news from the AOL News App. However, the user (e.g., user 102 and/or 142) does not want to miss out on political stories that are exclusive to the AOL News app, or celebrity gossip which is released to AP Mobile app before appearing on the Google News app. Consequently, the user may receive three notifications in relatively close temporal proximity about the same news story. By setting the preferences separately for, for example, political affairs, celebrity gossip news and economic news, the number of duplicated notifications may be reduced.

If a user's preference is to receive notifications from one, or a subset, of the apps (e.g., APP 112, APP 114, APP 116, APP 152, APP 154 and/or APP 156) for a particular type of content, then processing proceeds through connector "B" to step 216.

If, however, a user's preference is to receive notifications from all of the apps (e.g., APP 112, APP 114, APP 116, APP 152, APP 154 and/or APP 156) for a particular type of content, then processing proceeds through connector "A" to step 222 in FIG. 2B. At step 222, the app (e.g., APP 112, APP 114, APP 116, APP 152, APP 154 and/or APP 156) is installed normally and processing ends at step 224.

At step 216, it is determined whether a delay time is to be set for applications of lower preference to allow applications of higher preference to send a notification. Typically, this determination may be based on a request to user 102 and/or 142 as to whether the user would like to set a delay time. For example, a notification relaying celebrity gossip may first be received from the AP Mobile app, which is a lower preference app (e.g., APP 112, APP 114, APP 116, APP 152, APP 154 and/or APP 156) for celebrity gossip. If a delay time is set for celebrity gossip content from the AP Mobile app, then the notification may not be displayed when received. If a notification with the same content is received during this delay time from the Google news app, an app with a higher preference, then the notification from the AP Mobile app may never be displayed. However, if a notification with the same content is not received during this delay time from the Google news app, then the notification from the AP Mobile app may be displayed once the delay time has expired. If it is determined that a delay time is to be set, then processing proceeds to step 218.

At step 218, the time delay to be set for apps (e.g., APP 112, APP 114, APP 116, APP 152, APP 154 and/or APP 156) of a lower preference to allow apps (e.g., APP 112, APP 114, APP 116, APP 152, APP 154 and/or APP 156) of a higher preference to send a notification is set. Also set is the time duration for which user 102 and/or 142 may wait for the receipt of one or more duplicate notifications.

Alternatively, if it is determined at step 216 that a delay time is not to be set, then processing proceeds to step 220.

At step 220, an app (e.g., APP 112, APP 114, APP 116, APP 152, APP 154 and/or APP 156) is installed, and notifications received from the newly installed app (e.g., APP 112, APP 114, APP 116, APP 152, APP 154 and/or APP 156) are scanned and compared to other notifications. This scan and compare feature is described in more detail below with respect to FIGS. 3A, 3B, and 3C. The computer-implemented method of FIGS. 2A and 2B ends at step 224.

Figure 3A:
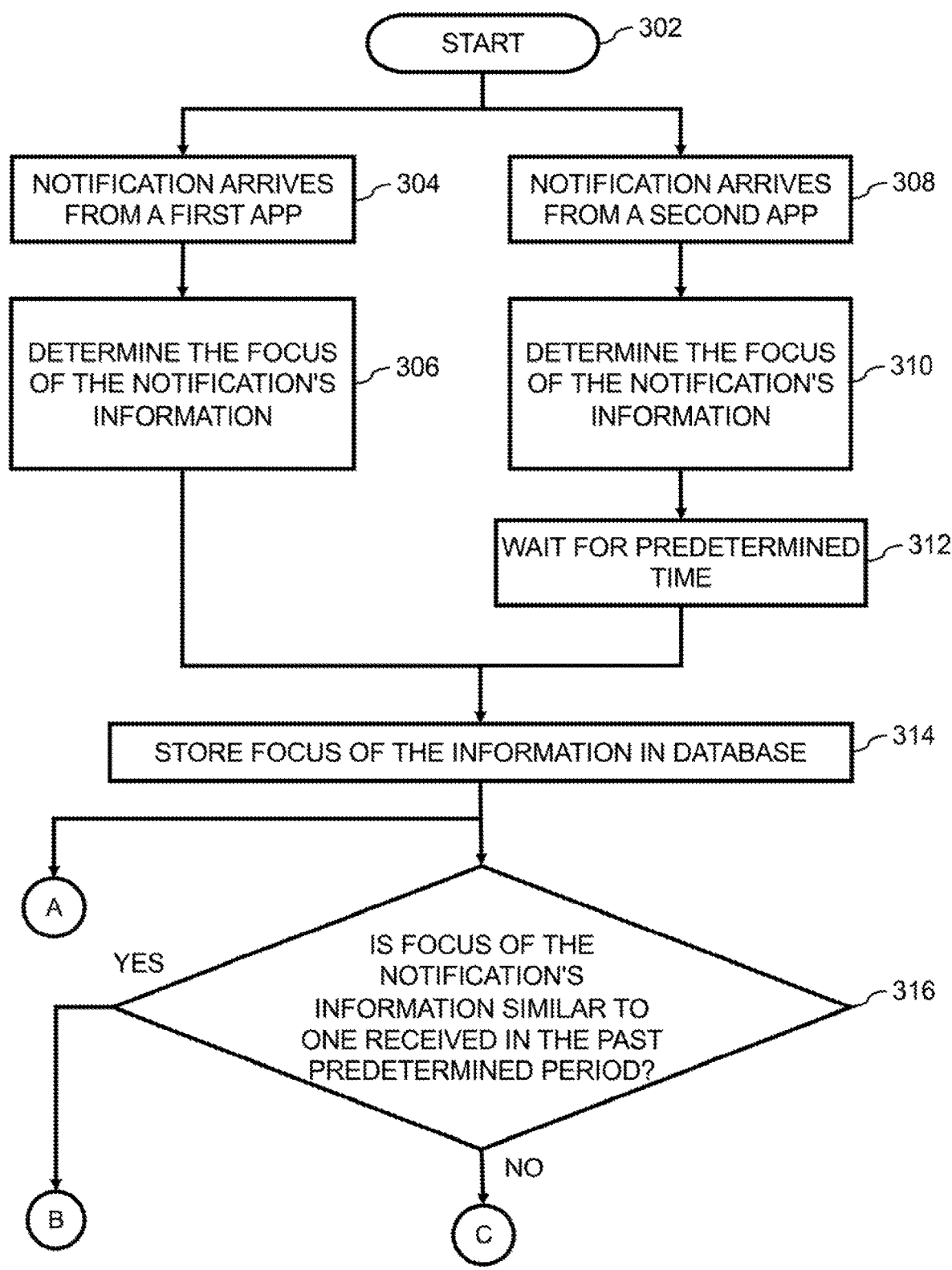
FIGS. 3A, 3B, and 3C are an operational flowchart illustrating a computer-implemented method for push notification management according to at least one embodiment.
Figure 3B:
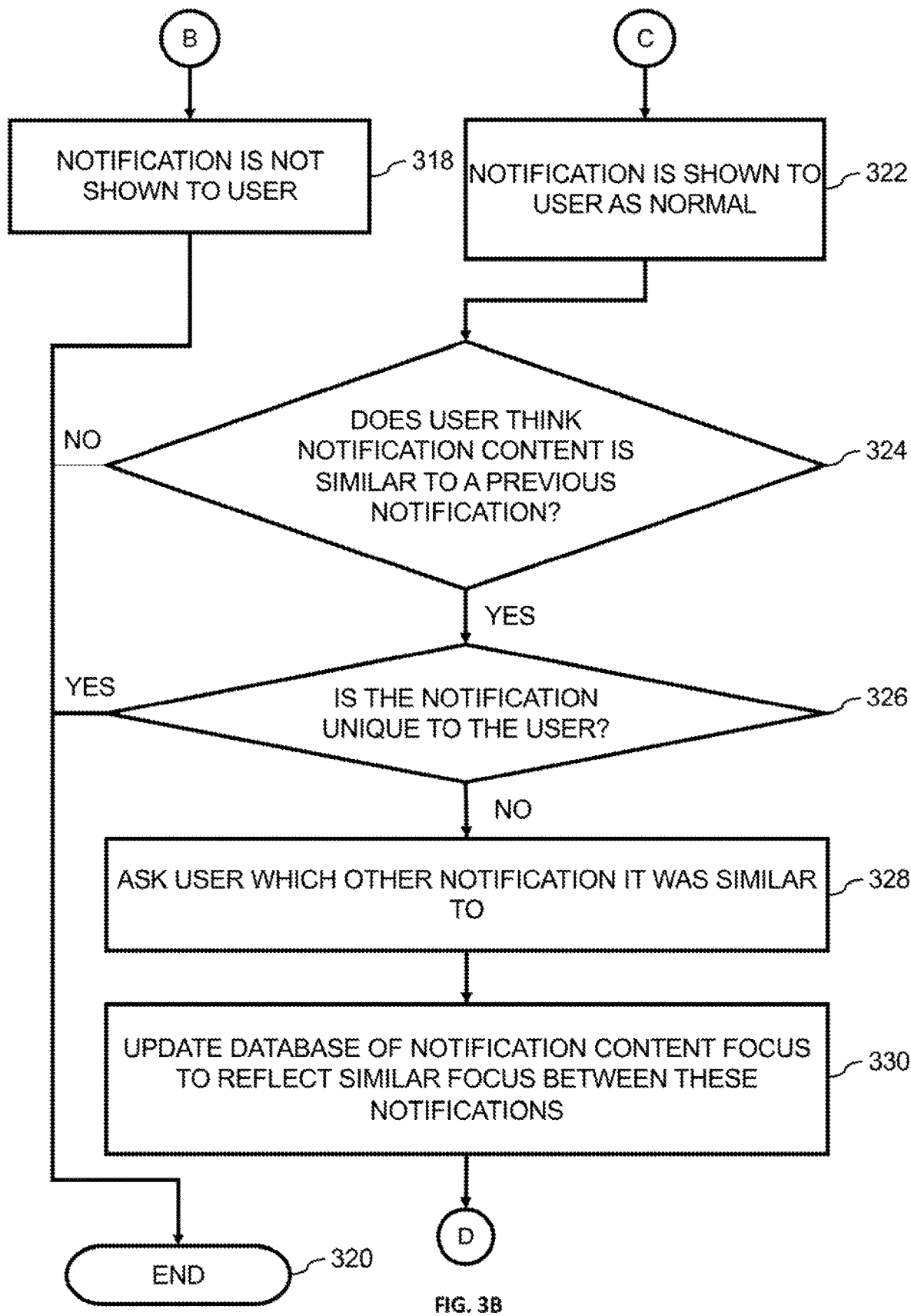
Figure 3C:
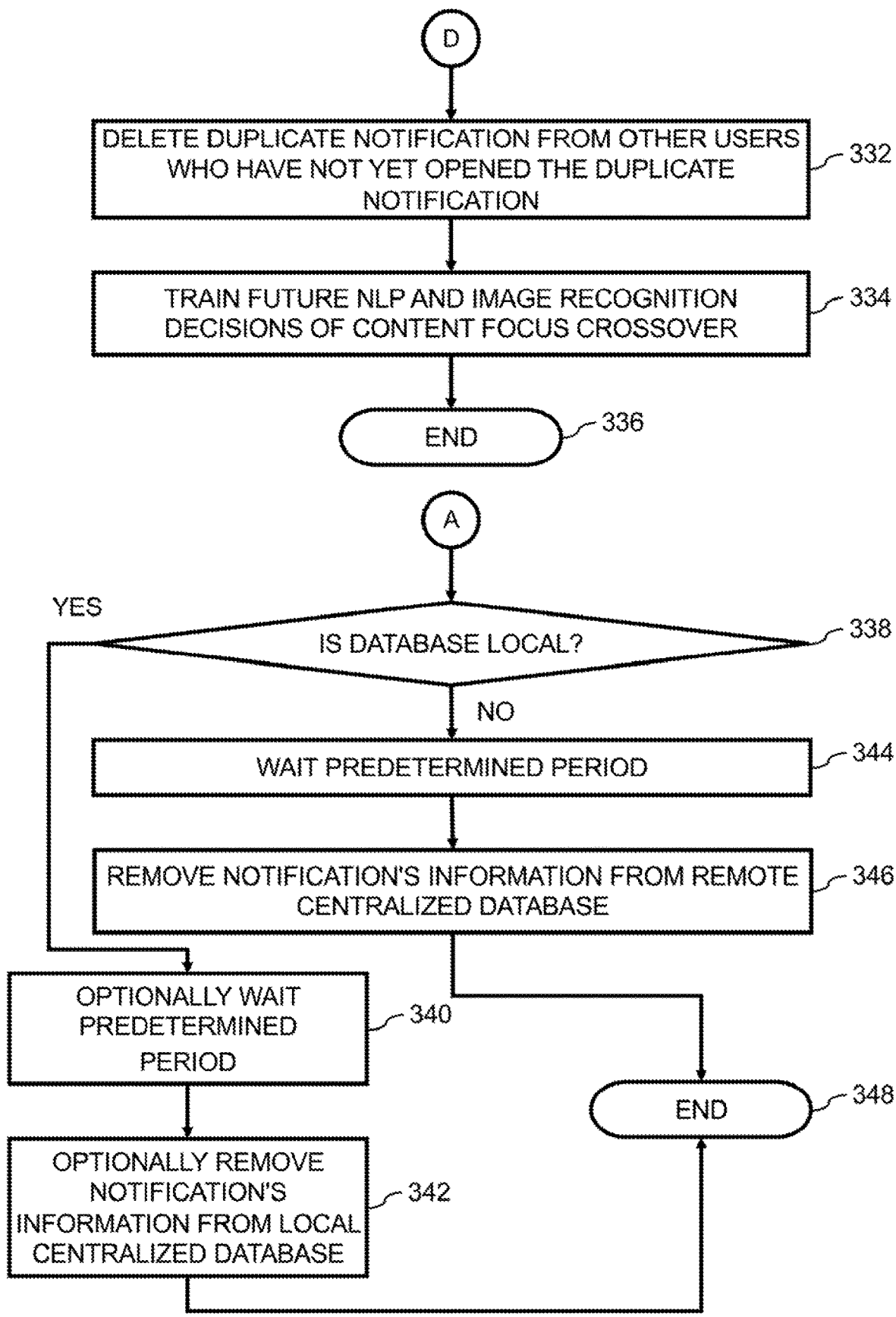

Referring now to FIGS. 3A, 3B, and 3C, an operational flowchart illustrating a computer-implemented method for push notification management according to at least one embodiment is depicted. The computer-implemented method of FIGS. 3A, 3B, and 3C starts at step 302. At step 304, a notification arrives from a first app (e.g., APP 112, APP 114, APP 116, APP 152, APP 154 and/or APP 156).

At step 306, the focus of the push notification from the first app (e.g., APP 112, APP 114, APP 116, APP 152, APP 154 and/or APP 156) is determined. For example, a news event may have a focus of Alexandria, VA, and/or a sports event may have a focus of the Washington Redskins American Football team. The notification and any content that the notification links to may be scanned, prior to showing the notification to user 102 and/or 142.

According to at least one embodiment of the present invention, this determination may be made by performing natural language processing on text and image recognition on images within the content of the notification. According to at least one other embodiment of the present invention, the identity of the author of the content may be checked. The check of an author may be particularly suitable for use with news apps (e.g., APP 112, APP 114, APP 116, APP 152, APP 154 and/or APP 156) because certain authors may write articles about particular types of news, including but not limited to, political and/or sports correspondents, among others. According to at least one other embodiment of the present invention, user 102 and/or 142 may flag notifications as being duplicates of information that the user has already seen in other notifications. The flagging of notifications may be used to help to train implementations of the embodiments described above. The flagging of notifications may further be used to mark duplicate notifications in a local centralized database 130 and/or 170 and/or a remote centralized database 180. The embodiments described above may be used individually or together in any combination. Any method of determining the focus of a piece of content may be used in addition to, or as an alternative to, the embodiments described above. Processing proceeds to step 314, which will be described in more detail below after the description of steps 308 through 312.

At step 308, a notification arrives from a second app (e.g., APP 112, APP 114, APP 116, APP 152, APP 154 and/or APP 156). At step 310, the focus of the received notification's information is determined. This has been described in more detail above with respect to step 306. This may be a duplicate push notification, and the focus of each of the duplicate push notifications may been determined. The notification and any content that the notification links to may be scanned, prior to showing (i.e., providing) the notification to user 102 and/or 142.

At step 312, the computer-implemented method waits for a predetermined period of time. This predetermined period of time may be optionally configured at step 216 of FIG. 2B, described in more detail above. The predetermined time may be a period of seconds and/or minutes, the exact number being at the discretion of user 102 and/or 142 and may be based on a historical analysis of the amount of time that lapses between duplicate notifications. The user's analysis (e.g., user 102 and/or 142) may consider the typical notification timing of notifications sent by the user's apps (e.g., a first news app sends a notification of the news within one minute of the news breaking on a news website such as The New York Times, while a second news app waits three minutes to send an update and provides a more meaningful, in depth discussion of the news event).

This means that, following receipt of the second push notification, the second push notification may only be displayed on device 110 and/or 150 after a predetermined time has elapsed without a first push notification being received from a preferred one of the plurality of apps (e.g., APP 112, APP 114, APP 116, APP 152, APP 154 and/or APP 156) having the same determined focus as that of the second push notification.

At step 314, the focus of each of the duplicate push notifications is stored in a database. The focus of each of the duplicate push notifications may be stored in a local centralized database 130 and/or 170 and/or a remote centralized database 180. According to at least one embodiment of the present invention, a local centralized database 130 and/or 170 and/or a remote centralized database 180 may be stored locally on device 110 and/or 150 where the notifications may be received. This may be characteristic of the notification if the notification is a private notification. According to at least one other embodiment of the present invention, a centralized database 180 may be stored remotely from device 110 and/or 150 where the notifications may be received. The focus of the information may be stored in a local centralized database 130 and/or 170 and/or a remote centralized database 180 for a predetermined period of time. The computer-implemented method of FIGS. 3A, 3B, and 3C now forks resulting in two portions of the computer-implemented method being executed, the first starting at step 316 and the second going through connector "A" to step 338 in FIG. 3C. The second portion will be described below.

At step 316, it is determined whether the focus of the notification's is similar to a notification received in a past period. This may be done by comparing the focus of the notification's information (i.e., newly received notification information) that has been received with one or more notifications received in a past predetermined period, which may be stored in a local centralized database 130 and/or 170 and/or a remote centralized database 180. If it is determined that the focus of the newly received notification's information is the same as a notification received in a past predetermined period and stored in a local centralized database 130 and/or 170 and/or a remote centralized database 180, then processing passes through connector "B" to step 318 in FIG. 3B. According to at least one embodiment of the present invention, the focus of a notification may be compared by, for example, natural language processing and image recognition on text and images within the content. The natural language processing (NLP) techniques, such as Watson™ (Watson and all Watson-based trademarks are trademarks or registered trademarks of International Business Machines Corporation in the United States, and/or other countries) techniques, may include, for example, a natural language classifier API (e.g., Watson™ Natural Language Classifier API). According to at least one other embodiment of the present invention, the focus of a notification may be determined by looking at the author of the content. This may be useful in news applications, because certain authors write content about different types of news, such as, for example, political and/or sports correspondents, among others. According to at least one other embodiment of the present invention, user 110 and/or 150 may flag notifications (e.g., by providing an indication within the program) as being duplicates of information the user has already seen in one or more other notifications. This information received from the user may be used to train (e.g., using a machine learning algorithm) methods of the above embodiments to recognize a duplicate notification in the future, as well as to record the user 110 and/or 150 marked duplicates in a local centralized database 130 and/or 170 and a remote centralized database 180.

Referring now to FIG. 3B, at step 318, the notification is not shown to the user because it is the same as one received in the past predetermined period and stored in a local centralized database 130 and/or 170 and/or a remote centralized database 180. Processing ends at step 320.

If, at step 316, it was determined that the focus of the newly received notification information was not the same as the notification received in a past predetermined period and stored in a local centralized database 130 and/or 170 and/or a remote centralized database 180, then processing passes through connector "A" to step 322 in FIG. 3B. At step 322, the notification is shown to (e.g., displayed for) user 102 and/or 142 because the newly received notification contains different information than the one or more notifications received in a past predetermined period and stored in a local centralized database 130 and/or 170 and/or a remote centralized database 180. This means that the focus of the first push notification may not have been the same as the focus of the second push notification, and thus both push notifications may be displayed on the device of user 102 and/or 142.

At step 324, user 102 and/or 142 determines whether newly received notification content is similar to a previous notification that has been displayed to user 102 and/or 142. If user 102 and/or 142 determines that the notification content is not similar to a previous notification that has been displayed to user 102 and/or 142, then processing ends at step 320. If, however, user 102 and/or 142 determines that the notification content is similar to a previous notification that has been displayed to user 102 and/or 142, then processing proceeds to step 326. The determination as to whether the focus of a first push notification received from the first one of the plurality of applications (e.g., APP 112, APP 114, APP 116, APP 152, APP 154 and/or APP 156) is the same as the focus of a second push notification received from a second one of the plurality of applications (e.g., APP 112, APP 114, APP 116, APP 152, APP 154 and/or APP 156) comprises requesting a user of device 110 and/or 150 to provide input as to similarity. A user 102 and/or 142 may determine similarity based on a number of factors, including a summary of the content of the notification, a title of the notification, an appearance and/or style of the notification, a time that the notification was received, an author of the notification, and a genre and/or topic of the notification, among others. A user 102 and/or 142 may specify the basis for a determination of similarity or dissimilarity in a comment box provided within the program. Comments provided by user 102 and/or 142 may assist a machine learning algorithm to gather accurate information and to accurately learn a preference of user 102 and/or 142.

At step 326, it is determined whether the notification is unique to user 102 and/or 142, such as, for example, a personal message. If the notification is not unique to user 102 and/or 142, then there may be a benefit to other users in having user 102 and/or 142 identify that this notification content is similar to a previous notification so that this notification is not displayed to other users (e.g., user 102 and/or 142). If it is determined that the notification is unique to user 102 and/or 142, then processing ends at step 320. If it is determined that the notification is not unique to user 102 and/or 142, then processing proceeds to step 328.

At step 328, user 102 and/or 142 identifies another notification which is similar to that received by user 102 and/or 142. This identification by user 102 and/or 142 is made based on the fact that user 102 and/or 142 may have indicated that the notification content is similar to a previous notification that has been displayed to user 102 and/or 142 and that the notification is not unique to the user. Accordingly, user 102 and/or 142 may be asked to identify which other notification contains similar content to the newly received notification. This may be based on the one or more factors described with respect to step 324 above.

At step 330, a local centralized database 130 and/or 170 and/or a remote centralized database 180 of notification content focus is updated to reflect a similar focus of received notifications. This may mean that the determination regarding similarity, made by user 102 and/or 142, as well as any comments inputted by user 102 and/or 142 describing the basis for such determination may be uploaded to a local centralized database 130 and/or 170 and/or a remote centralized database 180. This information may be used to train a machine learning algorithm.

According to at least one embodiment of the present invention, the remote centralized database 180 is stored remotely, and for notifications which are not unique to a single user 102 and/or 142, updating the remote centralized database 180 means that duplicated notifications are not displayed to other users 102 and/or 142.

According to at least one embodiment of the present invention, the local centralized database 130 and/or 170 is stored locally and either a notification is not shown to a user 102 and/or 142 because it has been determined to not be relevant, or a user 102 and/or 142 has manually determined that the notification is not relevant. In these instances, among others, the local centralized database 130 and/or 170 may not be updated because the local centralized database 130 and/or 170 may only be utilized by the device of user 102 and/or 142.

According to at least one other embodiment of the present invention, if the local centralized database 130 and/or 170 is stored locally and either a notification is not shown to a user 102 and/or 142 because it has been determined to not be relevant, or a user 102 and/or 142 has manually determined that the notification is not relevant, then the local centralized database 130 and/or 170 may be updated anyway so as to train the machine learning model. Processing proceeds through connector "D" to step 332 in FIG. 3C.

Referring now to FIG. 3C, at step 332, the notification that was identified by user 102 and/or 142 as being similar to the earlier notification is deleted from being viewed by one or more other users 102 and/or 142 who have not yet opened the duplicate notification.

At step 334, information about notifications that have been identified by the user as similar is used to train a machine learning algorithm regarding future natural language processing (NLP) techniques and image recognition decisions. For example, natural language processing techniques may be used to determine the frequency that a given app (e.g., APP 112, APP 114, APP 116, APP 152, APP 154 and/or APP 156) sends a notification similar to another app (e.g., APP 112, APP 114, APP 116, APP 152, APP 154 and/or APP 156). The computer-implemented method of FIGS. 3A, 3B, and 3C ends at step 336.

Referring back to FIG. 3A, at step 314, the second portion of the computer-implemented method going through connector "A" to step 338 in FIG. 3C was mentioned above. Referring now to FIG. 3C, at step 338, the location of the centralized database is determined. For example, it is determined whether there is a local centralized database 130 and/or 170 and/or a remote centralized database 180. If it is determined that there is a remote centralized database 180, then processing proceeds to step 340. At step 340, the computer-implemented method optionally waits for a predetermined period of time. At step 342, the notification's information is optionally removed from the local centralized database 180. This removal allows information to be stored for as long as it may be relevant while permitting the amount of storage used to be limited. Steps 340 and 342 are optional because, according to at least one embodiment of the present invention, the local centralized database 130 and/or 170 may not need to have older notification information removed, meaning that processing may proceed directly from a positive response at step 338 to end at step 348. According to at least one other embodiment of the present invention, steps 340 and 342 correspond to steps 344 and 346, discussed below, but the predetermined period of time at step 340 may differ from that of step 344 and, at step 342, the notification's information is removed from the local centralized database 130 and/or 170, rather than the remote centralized database 180. The computer-implemented method of FIGS. 3A, 3B, and 3C ends at step 348. This means that the input received from the user 102 and/or 142 as to similarity between the push notifications is stored in a remote centralized database 180, the input being operable to be used with other devices 110 and/or 150 having the first one and the second one of the plurality of applications (e.g., APP 112, APP 114, APP 116, APP 152, APP 154 and/or APP 156).

If it is determined that there is a local centralized database 130 and/or 170, then processing proceeds to step 344. At step 344, the computer-implemented method waits for a predetermined period of time. This predetermined period of time for a remote centralized database 180 may be different from the predetermined period of time used at step 340 for a local centralized database 130 and/or 170. At step 346, the notification's information may be removed from the remote centralized database 180. This removal may permit information to be stored for as long a period of time as the information may be relevant, while still permitting the amount of storage used to be limited. The computer-implemented method of FIGS. 3A, 3B, and 3C ends at step 348.

Figure 4:
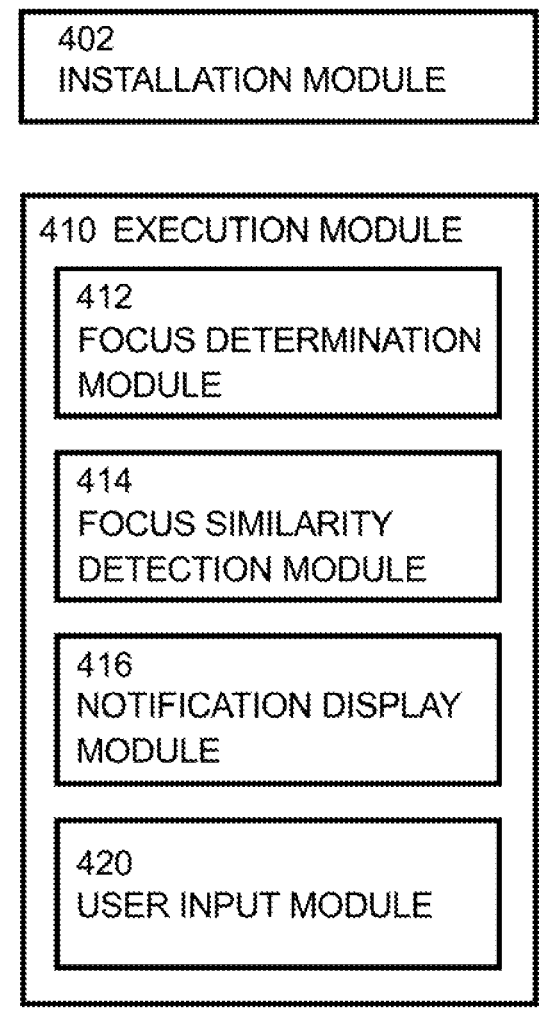
FIG. 4 is a block diagram of the push notification management program according to at least one embodiment.

Referring now to FIG. 4, a block diagram of the push notification management program according to at least one embodiment of the present invention is depicted. FIG. 4 may relate to the method, computer system, and computer program product for reducing the display of duplicate push notifications in device 110 and/or 150 having a plurality of applications (e.g., APP 112, APP 114, APP 116, APP 152, APP 154 and/or APP 156), the duplicate push notifications being generated by one of the plurality of applications (e.g., APP 112, APP 114, APP 116, APP 152, APP 154 and/or APP 156). The push notification management program comprises an installation module 402 which may identify a first one of the plurality of applications (e.g., APP 112, APP 114, APP 116, APP 152, APP 154 and/or APP 156) as a preferred one of the plurality of applications (e.g., APP 112, APP 114, APP 116, APP 152, APP 154 and/or APP 156) from which push notifications are to be displayed on device 110 and/or 150. The push notification management program may further comprise an execution module 410, comprising a focus determination module 412, a focus similarity detection module 414, and a notification display module 416. The focus determination module 412 may determine the focus of each of the duplicate push notifications. The focus similarity detection module 414 may determine whether the focus of a first push notification received from the first one of the plurality of applications (e.g., APP 112, APP 114, APP 116, APP 152, APP 154 and/or APP 156) is the same as the focus of a second push notification received from a second one of the plurality of applications (e.g., APP 112, APP 114, APP 116, APP 152, APP 154 and/or APP 156). The notification display module 416, responsive to the focus of the first push notification being the same as the focus of the second push notification, may display on device 110 and/or 150 only the first push notification.

According to at least one embodiment of the present invention, following receipt of the second push notification, the second push notification is only displayed on device 110 and/or 150 after a predetermined time has elapsed without a first push notification being received from a preferred one of the plurality of applications (e.g., APP 112, APP 114, APP 116, APP 152, APP 154 and/or APP 156) having the same focus as that of the second push notification.

A further embodiment of the present invention may comprise a local centralized database 130 and/or 170 wherein the focus of each of the duplicate push notifications is stored in the local centralized database 130 and/or 170.

According to at least one embodiment of the present invention, the execution module 410 may further comprise a user input module 420 for requesting a user of device 110 and/or 150 to provide input as to similarity between the focus of a first push notification received from the first one of the plurality of applications and the focus of a second push notification received from a second one of the plurality of applications. In a preferred embodiment, the execution module 410 may further comprise a remote centralized database 180, the input received from user 102 and/or 142, through the user input module 420, as to similarity between the push notifications being stored in the remote centralized database 180, the input being operable to be used with other devices 110 and/or 150 having the first one and the second one of the plurality of applications (e.g., APP 112, APP 114, APP 116, APP 152, APP 154 and/or APP 156).

Figure 5:
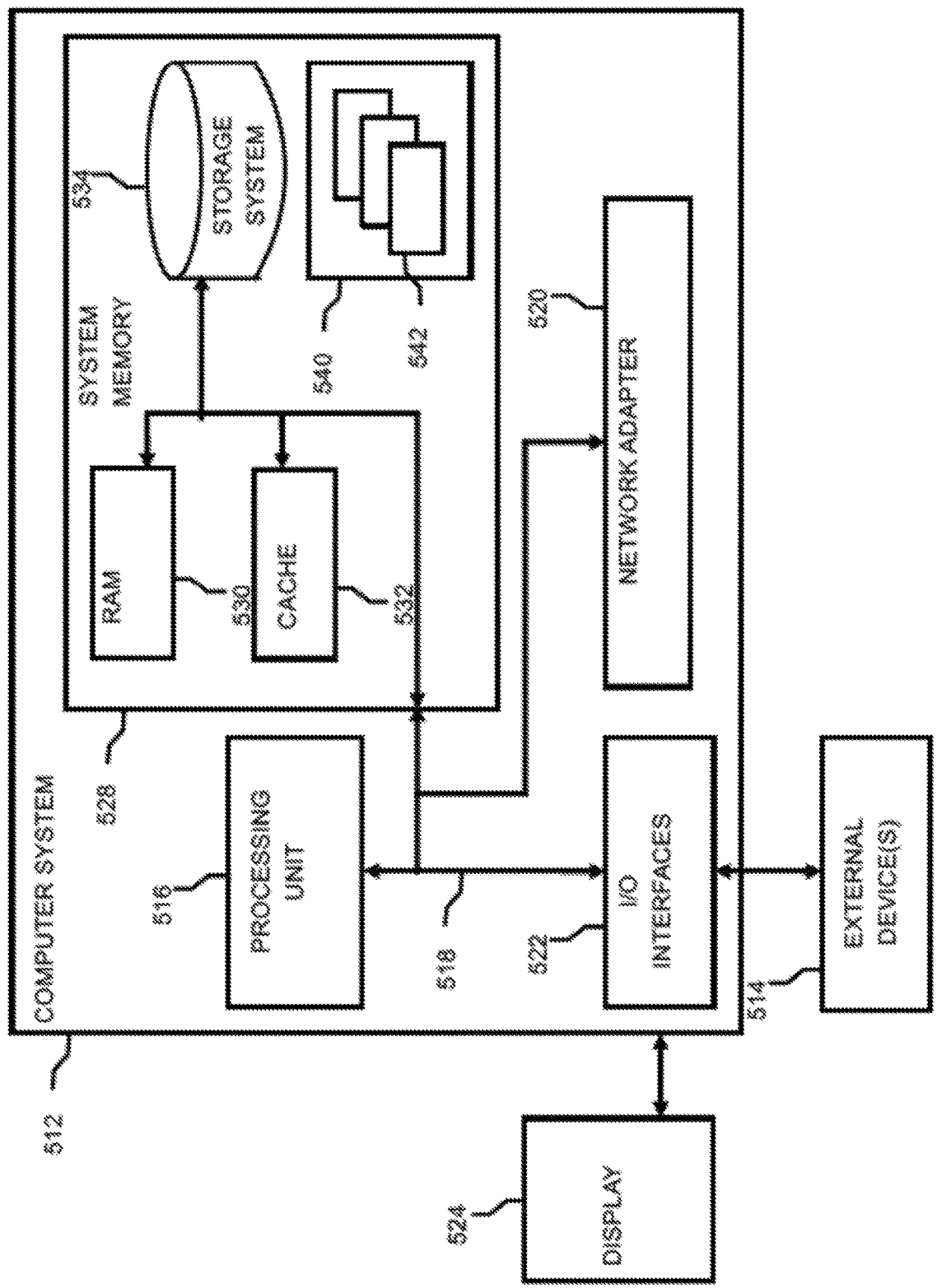
FIG. 5 is a block diagram of a computer system in which embodiments may be implemented.

Referring now to FIG. 5, a schematic of an example of computing system is shown. Computing system 512 is only one example of a suitable computing system and is not intended to suggest any limitation as to the scope of use or functionality of embodiments of the invention described herein. Regardless, computing system 512 is capable of being implemented and/or performing any of the functionality set forth hereinabove.

Computer system/server 512 is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random-access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
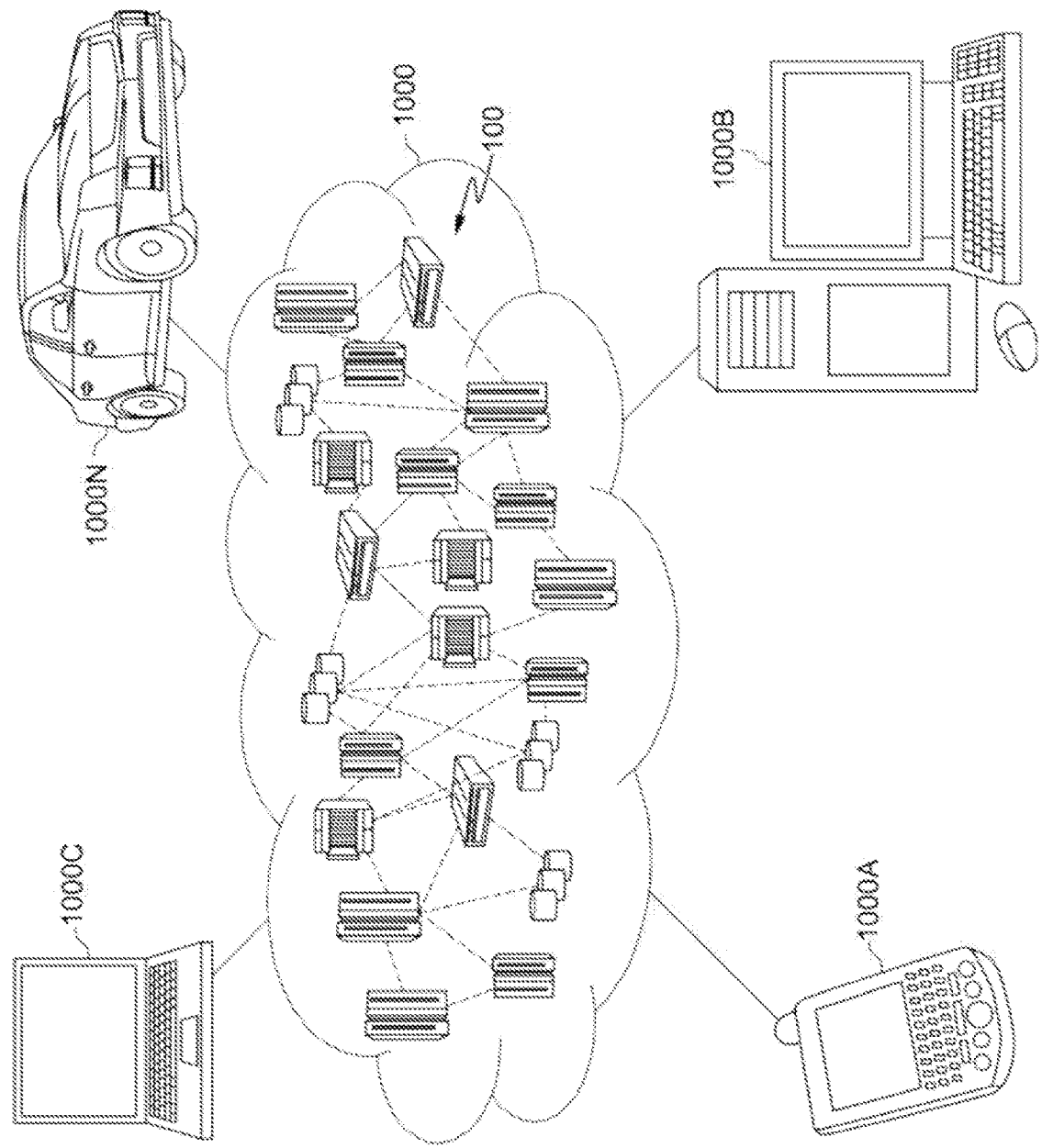
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
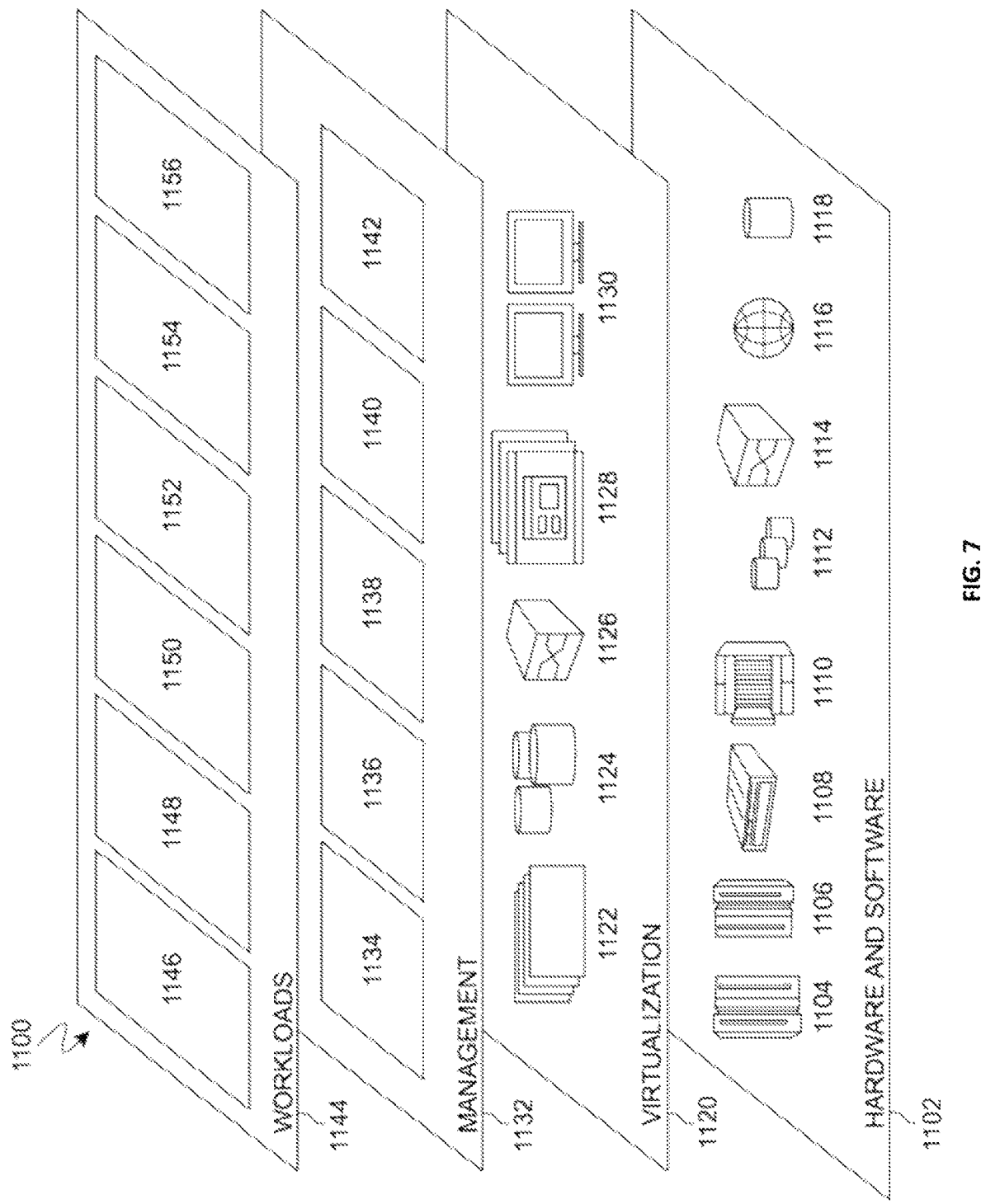
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and push notification management program 1156. A push notification management program 110a, 110b provides a way to manage a plurality of notifications having the same or similar content based on user preferences.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for reducing the display of duplicate push notifications in a device having a plurality of applications, the duplicate push notifications being generated by one of the plurality of applications, the method comprising:

identifying a first one of the plurality of applications as a preferred one of the plurality of applications from which push notifications are to be displayed on the device;

determining the focus of each of the duplicate push notifications;

determining whether the focus of a first push notification received from the first one of the plurality of applications is the same as the focus of a second push notification received from a second one of the plurality of applications by having requested a user of the device to provide input as to similarity and updating a remote database based on the user input, the input being operable to be used with other devices of different users having the first one and the second one of the plurality of applications; and responsive to the focus of the first push notification being the same as the focus of the second push notification, and based on a predetermined time that elapsed between the first push notification and the second push notification, based on a historical analysis of an amount of time that lapses between notifications of the determined focus, displaying on the device only the first push notification.

2. The method of claim 1, wherein following receipt of the second push notification, the second push notification is only displayed on the device after the predetermined time has elapsed without a first push notification being received from a preferred one of the plurality of applications having the same focus as that of the second push notification.

3. The method of claim 1, wherein the focus of each of the duplicate push notifications is stored in a local database.

4. The method of claim 1, wherein the determination as to whether the focus of a first push notification received from the first one of the plurality of applications is the same as the focus of a second push notification received from a second one of the plurality of applications comprises accessing the remote database updated to reflect the determined similarity of the first one and the second one of the push notifications.

5. The method of claim 1, wherein the user input from the user of the device is used to train a machine learning algorithm regarding a duplicate notification.

6. The method of claim 5, wherein the machine learning algorithm is used to improve a natural language processing (NLP) technique and an image recognition decision.

7. A computer system for reducing the display of duplicate push notifications in a device having a plurality of applications, the duplicate push notifications being generated by one of the plurality of applications, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system comprises:

an installation module which identifies a first one of the plurality of applications as a preferred one of the plurality of applications from which push notifications are to be displayed on the device; and an execution module comprising:

a focus determination module which determines the focus of each of the duplicate push notifications;

a focus similarity detection module which determines whether the focus of a first push notification received from the first one of the plurality of applications is the same as the focus of a second push notification received from a second one of the plurality of applications by having requested a user of the device to provide input as to similarity and updating a remote database based on the user input, the input being operable to be used with other devices of different users having the first one and the second one of the plurality of applications; and a notification display module which, responsive to the focus of the first push notification being the same as the focus of the second push notification, and based on a predetermined time that elapsed between the first push notification and the second push notification, based on a historical analysis of an amount of time that lapses between notifications of the determined focus, displays on the device only the first push notification.

8. The computer system of claim 7, wherein following receipt of the second push notification, the second push notification is only displayed on the device after the predetermined time has elapsed without a first push notification being received from a preferred one of the plurality of applications having the same focus as that of the second push notification.

9. The computer system of claim 7, further comprising a local database and wherein the focus of each of the duplicate push notifications is stored in the local database.

10. The computer system of claim 7, further comprising accessing the remote database updated to reflect the determined similarity of the first one and the second one of the push notifications.

11. The computer system of claim 7, wherein the user input from the user of the device is used to train a machine learning algorithm regarding a duplicate notification.

12. A computer program product for reducing the display of duplicate push notifications in a device having a plurality of applications, the duplicate push notifications being generated by one of the plurality of applications, the computer program product comprising:

one or more non-transitory computer-readable storage media and program instructions stored on at least one of the one or more tangible storage media, the program instructions executable by a processor to cause the processor to:

identify a first one of the plurality of applications as a preferred one of the plurality of applications from which push notifications are to be displayed on the device;

determine the focus of each of the duplicate push notifications;

determine whether the focus of a first push notification received from the first one of the plurality of applications is the same as the focus of a second push notification received from a second one of the plurality of applications by having requested a user of the device to provide input as to similarity and updating a remote database based on the user input, the input being operable to be used with other devices of different users having the first one and the second one of the plurality of applications; and responsive to the focus of the first push notification being the same as the focus of the second push notification, and based on a predetermined time that elapsed between the first push notification and the second push notification, based on a historical analysis of an amount of time that lapses between notifications of the determined focus, display on the device only the first push notification.

13. The computer program product of claim 12, wherein following receipt of the second push notification, the second push notification is only displayed on the device after the predetermined time has elapsed without a first push notification being received from a preferred one of the plurality of applications having the same focus as that of the second push notification.

14. The computer program product of claim 12, wherein the focus of each of the duplicate push notifications is stored in a local database.

15. The computer program product of claim 12, wherein the determination as to whether the focus of a first push notification received from the first one of the plurality of applications is the same as the focus of a second push notification received from a second one of the plurality of applications comprises accessing the remote database updated to reflect the determined similarity of the first one and the second one of the push notifications.

16. The computer program product of claim 13, wherein the user input from the user of the device is used to train a machine learning algorithm regarding a duplicate notification.

17. The computer program product of claim 16, wherein the machine learning algorithm is used to improve a natural language processing (NLP) technique and an image recognition decision.

* * * * *